under 35 U.S.C. 154(b) by 316 days.

(12) United States Patent
Hamabe et al.

(10) Patent No.: US 9,371,734 B2
(45) Date of Patent: Jun. 21, 2016

(54) TURBINE BLADE

(71) Applicant: IHI CORPORATION, Tokyo (JP)

(72) Inventors: Masaaki Hamabe, Tokyo (JP); Ayumi Mamada, Tokyo (JP); Ruriko Yamawaki, Tokyo (JP); Hiroshi Hamazaki, Tokyo (JP)

(73) Assignee: IHI CORPORATION, Tokyo (JP)

( * ) Notice: Subject to any disclaimer, the term of this patent is extended or adjusted under 35 U.S.C. 154(b) by 316 days.

(21) Appl. No.: 14/113,265

(22) Filed: Oct. 22, 2013

(65) Prior Publication Data

US 2014/0112795 A1 Apr. 24, 2014

Related U.S. Application Data

(63) Continuation of application No. PCT/JP2012/061422, filed on Apr. 27, 2012.

(30) Foreign Application Priority Data

Apr. 28, 2011 (JP) ................................. 2011-101266

(51) Int. Cl.
*F01D 5/14* (2006.01)

(52) U.S. Cl.
CPC  *F01D 5/145* (2013.01); *F01D 5/14* (2013.01); *F01D 5/141* (2013.01); *F05D 2250/322* (2013.01); *F05D 2250/70* (2013.01); *F05D 2250/71* (2013.01); *F05D 2270/17* (2013.01); *Y02T 50/671* (2013.01); *Y02T 50/673* (2013.01)

(58) Field of Classification Search
CPC ........... F01D 5/14; F01D 5/141; F01D 5/145; F01D 2250/71; F05D 2250/322; F05D 2250/70; F05D 2270/17; Y02T 50/671; Y02T 50/672

See application file for complete search history.

(56) References Cited

U.S. PATENT DOCUMENTS

| 6,461,110 | B1 * | 10/2002 | By ......................... | F01D 5/141 415/191 |
| 6,769,879 | B1 * | 8/2004 | Cleveland ............... | F01D 5/141 416/223 A |
| 7,597,544 | B2 * | 10/2009 | Hasenjager ............. | F01D 5/141 416/242 |
| 8,911,215 | B2 * | 12/2014 | Cornelius ............... | F01D 5/141 416/242 |

FOREIGN PATENT DOCUMENTS

| DE | 100 39 642 A1 | 3/2002 |
| JP | 2003-254002 A | 9/2003 |
| JP | 2005-076533 A | 3/2005 |
| JP | 2011-017290 A | 1/2011 |

* cited by examiner

*Primary Examiner* — Igor Kershteyn
(74) *Attorney, Agent, or Firm* — Volpe and Koenig, P.C.

(57) ABSTRACT

A turbine blade has a profile including a blade suction side line, a blade pressure side line, and a blade trailing edge formed by a curve connecting the rear ends of the blade suction side and pressure side lines to each other, wherein the curve forming the blade trailing edge of the profile is formed by connecting a pressure side curve portion which has an arc shape having a constant radius of curvature and extending from the rear end of the blade pressure side line toward the camber line of the profile, and a suction side curve portion which extends from the rear end of the blade suction side line toward the camber line while passing through a region closer to the camber line than a symmetric curve portion which is line-symmetric to the pressure side curve portion with respect to the camber line.

12 Claims, 5 Drawing Sheets

TURBINE BLADE

CROSS REFERENCE TO RELATED APPLICATION

This application is a continuation of International Application No. PCT/JP2012/061422 filed Apr. 27, 2012, which claims priority to Japanese Patent Application No. 2011-101266, filed Apr. 28, 2011 the entire contents of all of which are incorporated by reference as if fully set forth.

TECHNICAL FIELD

The present invention relates to turbine blades used, for example, in jet engines for aircraft.

BACKGROUND ART

Attention has been directed to profile loss as a factor in improving the performance of turbine blades of the aforementioned type. The main cause of the profile loss is a loss caused by velocity distribution defects attributable to wake flows behind the blade trailing edges of the turbine blades. Thus, in order to reduce the profile loss, it is important to keep the velocity distribution defects as low as possible.

It has been known that a turbine blade whose blade trailing edge has a smaller thickness shows less velocity distribution defects. Many of turbine blades employ a blade trailing edge having a profile such that the blade suction side line and the blade pressure side line are connected by an arc corresponding to nearly the half of a true circle or by a straight line perpendicular to the camber line.

Where the turbine blade has such a profile that the blade trailing edge has a semicircular shape, the thickness of the blade trailing edge cannot be made smaller than the diameter of the semicircle. As a result, the blade trailing edge of the turbine blade becomes relatively large in thickness and produces significant wake flows, causing relatively large velocity distribution defects.

As conventional turbine blades configured to reduce the velocity distribution defects, the turbine blade disclosed in Patent Document 1 has been known, by way of example.

The trailing edge portion of the turbine blade disclosed in Patent Document 1 has such a curved surface that the radius of curvature gradually decreases from one of the blade suction side and pressure side lines toward the rear end located at the most downstream side as viewed in the fluid flowing direction, is the smallest at the rear end, and then gradually increases from the rear end toward the other of the blade suction side and pressure side lines up to the other of the blade suction side and pressure side lines.

PRIOR ART DOCUMENTS

Patent Documents

Patent Document 1: Unexamined Japanese Patent Publication No. 2011-017290

SUMMARY OF THE INVENTION

Problems to be Solved by the Invention

Compared with the turbine blade whose blade trailing edge has a semicircular shape, the turbine blade disclosed in Patent Document 1 permits the blade trailing edge to be reduced in thickness while ensuring satisfactory strength, but has an increased blade chord length. Thus, the increased blade chord length possibly leads to a correspondingly increased weight of the blade or exerts an undesirable influence on structural design as a result of change in axial clearance between the blades, and a solution to these problems has been sought.

The present invention was made in view of the problems associated with the conventional art, and an object thereof is to provide a turbine blade which ensures satisfactory strength without entailing increase in blade weight or undesirable influence on structural design and which is also capable of further improving performance and increasing work by suppressing loss attributable to velocity distribution defects.

Means for Solving the Problems

To achieve the object, the present invention provides a turbine blade with a profile including a blade suction side line, a blade pressure side line, and a blade trailing edge formed by a curve connecting a rear end of the blade suction side line and a rear end of the blade pressure side line to each other, wherein the curve forming the blade trailing edge of the profile is formed by connecting a pressure side curve portion which has an arc-like shape having a constant radius of curvature and extending from the rear end of the blade pressure side line toward a camber line of the profile, and a suction side curve portion which extends from the rear end of the blade suction side line toward the camber line while passing through a region closer to the camber line than a symmetric curve portion which is line-symmetric to the pressure side curve portion with respect to the camber line.

In the case of a turbine blade with a camber, the camber line, which is the center line of the blade profile, is curved but is almost straight at the blade trailing edge. Thus, also in the turbine blade of the present invention, the camber line at the blade trailing edge is treated as a straight line.

Preferably, the suction side curve portion is represented by a curve constituting an ellipse and extending from the center of a curve portion along a major axis of the ellipse toward the center of a curve portion along a minor axis of the ellipse.

Also, a connection point between the rear end of the blade suction side line and the suction side curve portion is preferably located at a position spaced from a rearmost end of the blade trailing edge of the profile by a distance greater than or equal to the radius of the pressure side curve portion and is within a range of 10% or less of a chord length of the turbine blade.

Preferably, the connection point between the rear end of the blade suction side line and the suction side curve portion is located at a position spaced from the rearmost end of the blade trailing edge of the profile by a distance greater than or equal to three times the radius of the pressure side curve portion and is within a range of 10% or less of a chord length of the turbine blade.

As illustrated in FIG. 2, a position (perigee) S that can be set as the connection point P between the rear end of the blade suction side line 2 and the suction side curve portion 4b and is nearest to the rearmost end 5a of the blade trailing edge 5 is determined on the basis of the radius R of the arc-like pressure side curve portion 4a. Provided that the turbine blade has a chord length C, the radius R of the circle is very often set to 0.5% to 2% of the blade chord length C.

On the other hand, a position (apogee) that can be set as the connection point P between the rear end of the blade suction side line 2 and the suction side curve portion 4b and is farthest from the rearmost end 5a of the blade trailing edge 5 is determined so as to be spaced from the rearmost end 5a of the blade trailing edge 5 of the profile by a distance of 10% or less of the blade chord length, in order to reduce the thickness of the blade trailing edge 5 as well as change in natural frequency. FIG. 2 illustrates the case where the connection point P between the rear end of the blade suction side line 2 and the suction side curve portion 4b is located at a position spaced from the rearmost end 5a of the blade trailing edge 5 by a distance of 5% of the blade chord length C.

Preferably, a connection point between the pressure side curve portion and the suction side curve portion is located so as to be within a range of 30° from the camber line to either one of suction side and pressure side of the camber line about the center of the pressure side curve portion lying on the camber line.

In this case, the connection point between the pressure side curve portion and the suction side curve portion can be shifted to either one of the suction side and pressure side of the camber line, so that greater flexibility is ensured for the connection between the pressure side curve portion and the suction side curve portion, facilitating manufacture.

In the turbine blade of the present invention, the suction side curve portion of the curve forming the blade trailing edge extends from the rear end of the blade suction side line to the vicinity of the camber line while passing through the region closer to the camber line than the symmetric curve portion which is line-symmetric to the pressure side curve portion with respect to the camber line. Accordingly, a primary flow (air flow) is accelerated along the suction side curve portion, thus reducing a boundary layer, and in addition, the primary flow is bent from the suction side curve portion toward the pressure side curve portion due to the Coanda effect, so that the exit flow angle of the primary flow from the blade trailing edge increases.

That is, the thickness of the blade from the blade leading edge through the blade trailing edge of the profile is maintained and only the blade trailing edge is reduced in thickness. It is therefore possible to minimize loss attributable to velocity distribution defects and also to increase work done by the turbine blade, without lowering mechanical strength and without entailing increase in weight of the blade or undesirable influence on structural design.

Effects of the Invention

With the turbine blade according to the present invention, remarkable effects can be obtained such as the effect of ensuring satisfactory strength without entailing increase in blade weight or undesirable influence on structural design, the effect of reducing loss attributable to velocity distribution defects to further improve performance, and the effect of increasing the exit flow angle of the primary flow from the blade trailing edge to thereby increase work done by the turbine blade.

MODE FOR CARRYING OUT THE INVENTION

The present invention will be described below with reference to the drawings.

Figure 1:
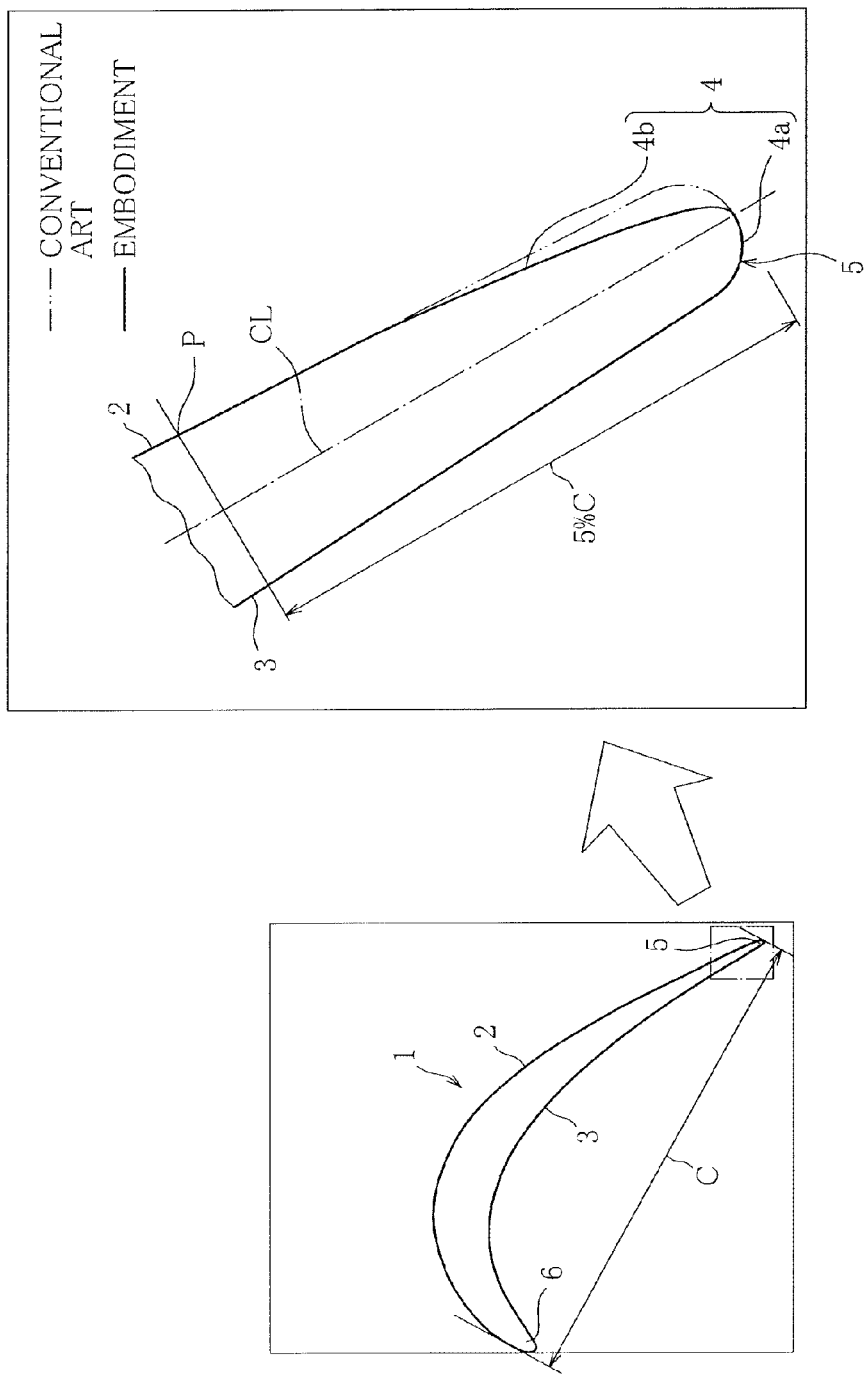
FIG. 1 is a diagram explaining a profile of a turbine blade according to one embodiment of the present invention.
Figure 2:
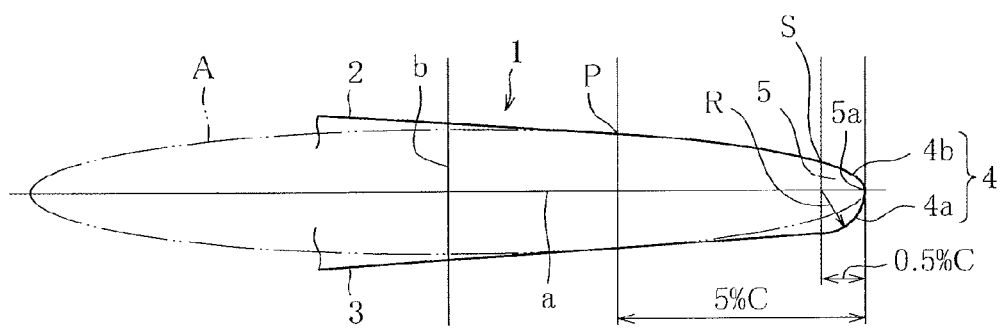
FIG. 2 is a diagram explaining the profile of the turbine blade of FIG. 1 and illustrating the manner of setting a connection point between the rear end of a blade suction side line and a suction side curve portion of a blade trailing edge.

FIGS. 1 and 2 illustrate a profile of a turbine blade according to one embodiment of the present invention.

As illustrated in FIG. 1, the turbine blade 1 has a profile including a blade suction side line 2, a blade pressure side line 3, a blade trailing edge 5, and a blade leading edge 6. The blade trailing edge 5 is formed by a curve 4 connecting the rear end of the blade suction side line 2 and the rear end of the blade pressure side line 3 to each other, as shown in the part of FIG. 1 illustrating the profile on an enlarged scale.

The curve 4 forming the blade trailing edge 5 of the profile includes a pressure side curve portion 4a and a suction side curve portion 4b. The pressure side curve portion 4a has an arc-like shape having a constant radius of curvature and extending from the rear end of the blade pressure side line 3 toward a camber line CL of the profile. The suction side curve portion 4b extends from the rear end of the blade suction side line 2 toward the camber line CL while passing through a region closer to the camber line CL than a symmetric curve portion which is line-symmetric to the pressure side curve portion 4 with respect to the camber line CL (the symmetric curve portion is a curve portion indicated by the two-dot chain line in the enlarged part of FIG. 1, i.e., a conventional suction side curve portion). The pressure side curve portion 4a and the suction side curve portion 4b are connected to each other near the camber line CL. As illustrated in FIG. 2, the suction side curve portion 4b is represented by a curve constituting an ellipse A and extending from the center of a curve portion along the major axis a of the ellipse A toward the center of a curve portion along the minor axis b of the ellipse A.

In this case, a connection point P between the rear end of the blade suction side line 2 and the suction side curve portion 4b of the curve 4 is set at a position spaced from the rearmost end 5a of the blade trailing edge 5 of the profile by a distance of 5% C (C is the blade chord length), with a view to reducing the thickness of the blade trailing edge 5 and also suppressing change in natural frequency.

Figure 3:
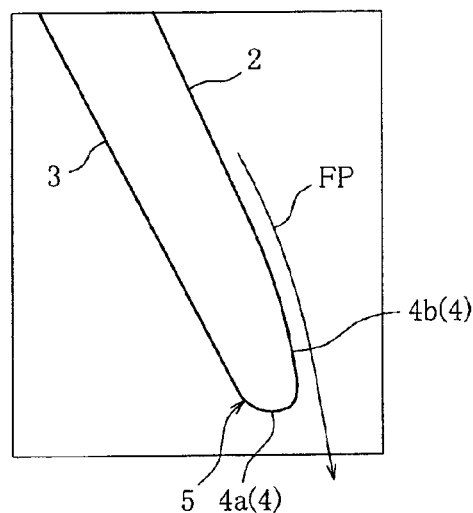
FIG. 3 is a diagram explaining the profile of the turbine blade of FIG. 1 and illustrating the manner of how a primary flow bends from the suction side curve portion toward a pressure side curve portion due to the Coanda effect.
Figure 4:
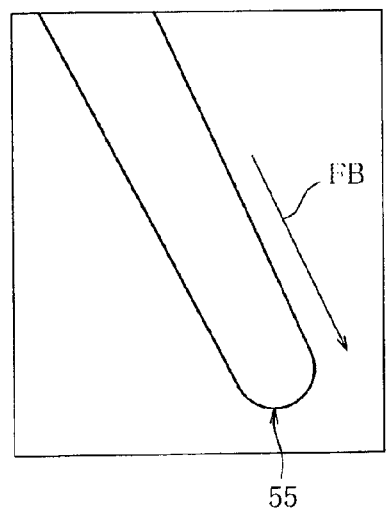
FIG. 4 is a diagram explaining a profile of a conventional turbine blade and illustrating the manner of how the primary flow travels along the suction side curve portion.

As stated above, in the turbine blade 1 of this embodiment, the ellipse-constituting curve extending from the rear end of the blade suction side line 2 and passing through the region closer to the camber line CL than the aforementioned symmetric curve portion is employed as the suction side curve portion 4b of the curve 4 forming the blade trailing edge 5. Accordingly, as illustrated in FIG. 3, a primary flow FP is accelerated along the suction side curve portion 4b and is bent from the suction side curve portion 4b toward the pressure side curve portion 4a due to the Coanda effect, so that the exit flow angle of the primary flow FP from the blade trailing edge 5 increases, compared with the conventional turbine blade of FIG. 4 in which a primary flow FB exits straight from a blade trailing edge 55.

That is, the thickness of the blade from the blade leading edge 6 through the blade trailing edge 5 of the profile is maintained and only the blade trailing edge 5 is reduced in thickness, compared with the blade trailing edge of the conventional turbine blade indicated by the two-dot chain line in the enlarged part of FIG. 1 (the conventional blade trailing edge is obtained by connecting the blade suction side line and the blade pressure side line by an arc corresponding to nearly the half of a true circle). It is therefore possible to suppress loss attributable to velocity distribution defects and to increase work done by the turbine blade 1, without lowering mechanical strength and without entailing increase in weight of the blade or undesirable influence on structural design.

With respect to each of the turbine blade 1 of the embodiment and the aforementioned conventional turbine blade, the reduction ratio of total pressure loss coefficient was measured for comparison, with the Reynolds number progressively increased such that the flow field gradually approached turbulent flow field. The measurement results obtained are shown in the graph of FIG. 5.

Figure 5:
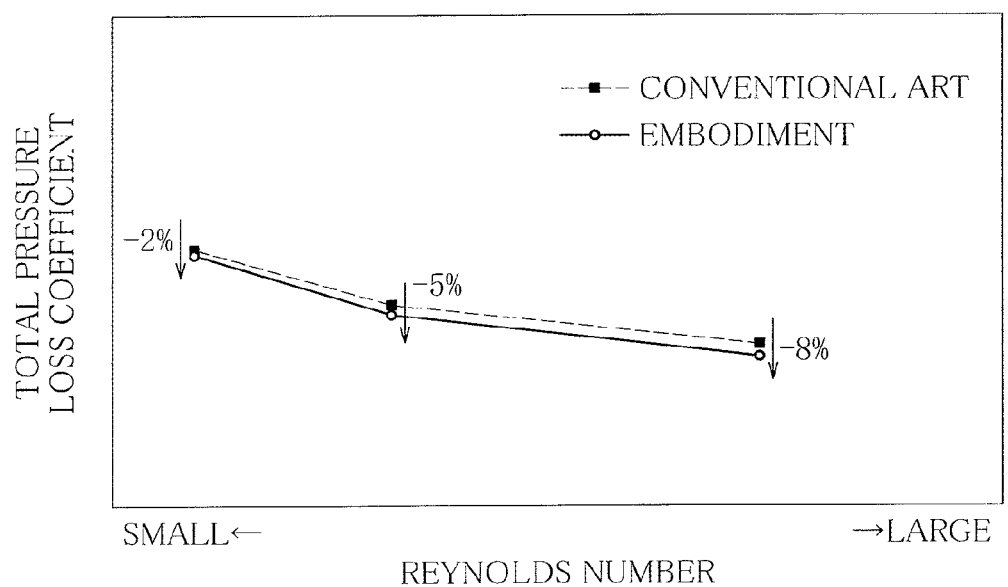
FIG. 5 is a graph showing a reduction ratio of total pressure loss coefficient according to the turbine blade of FIG. 1.

As illustrated in FIG. 5, where the Reynolds number is small, the turbine blade 1 of the embodiment and the conventional turbine blade show no substantial difference in the reduction ratio of the total pressure loss coefficient. Where the Reynolds number is large, however, the total pressure loss coefficient of the turbine blade 1 of the embodiment is lower by 8% than that of the conventional turbine blade. This demonstrates that the turbine blade 1 of the embodiment is capable of reducing loss caused by velocity distribution defects attributable to wake flows from the blade trailing edge 5.

Figure 6:
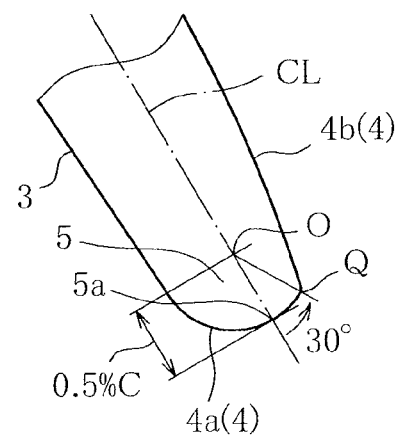
FIG. 6 is a diagram explaining a profile of a turbine blade according to another embodiment of the present invention and showing a rearmost end portion of the blade trailing edge on an enlarged scale.

In the embodiment of the present invention described above, the connection point between the pressure side and suction side curve portions 4a and 4b of the curve 4 forming the blade trailing edge 5 of the turbine blade 1 is located at the rearmost end 5a of the blade trailing edge 5 lying on the camber line CL. The position of the connection point is, however, not limited to the illustrated position, and as shown in FIG. 6, the connection point Q between the pressure side and suction side curve portions 4a and 4b of the curve 4 may be located so as to be within a range of 30° shifted to the suction side from the camber line CL about the center O of the pressure side curve portion 4a lying on the camber line CL.

Alternatively, the connection point Q between the pressure side and suction side curve portions 4a and 4b of the curve 4 may be located so as to be within a range of 30° shifted to the pressure side from the camber line CL about the center O of the pressure side curve portion 4a.

In this manner, since the connection point Q between the pressure side curve portion 4a and the suction side curve portion 4b can be shifted to either one of the suction side and pressure side of the camber line CL, greater flexibility is ensured for the connection between the pressure side curve portion 4a and the suction side curve portion 4b, facilitating manufacture.

The configuration of the turbine blade of the present invention is not limited to those explained above with reference to the embodiments.

EXPLANATION OF REFERENCE SIGNS

1: turbine blade
2: blade suction side line
3: blade pressure side line
4: curve
4a: pressure side curve portion
4b: suction side curve portion
5: blade trailing edge
5a: rearmost end of blade trailing edge
A: ellipse
a: major axis of ellipse
b: minor axis of ellipse
C: blade chord length
CL: camber line
FP: primary flow
O: center of pressure side curve portion
P: connection point between blade suction side line and suction side curve portion
Q: connection point between pressure side curve portion and suction side curve portion
R: radius of pressure side curve portion
S: perigee

The invention claimed is:

1. A turbine blade with a profile including a blade suction side line, a blade pressure side line, and a blade trailing edge formed by a curve connecting a rear end of the blade suction side line and a rear end of the blade pressure side line to each other,
    wherein the curve forming the blade trailing edge of the profile is formed by connecting a pressure side curve portion which has an arc-like shape having a constant radius of curvature and extending from the rear end of the blade pressure side line toward a camber line of the profile, and a suction side curve portion which extends from the rear end of the blade suction side line toward the camber line while passing through a region closer to the camber line than a symmetric curve portion which is line-symmetric to the pressure side curve portion with respect to the camber line.

2. The turbine blade according to claim 1, wherein the suction side curve portion is represented by a curve constituting an ellipse and extending from the center of a curve portion along a major axis of the ellipse toward the center of a curve portion along a minor axis of the ellipse.

3. The turbine blade according to claim 1, wherein a connection point between the rear end of the blade suction side line and the suction side curve portion is located at a position spaced from a rearmost end of the blade trailing edge of the profile by a distance greater than or equal to the radius of the pressure side curve portion and is within a range of 10% or less of a chord length of the turbine blade.

4. The turbine blade according to claim 2, wherein a connection point between the rear end of the blade suction side line and the suction side curve portion is located at a position spaced from a rearmost end of the blade trailing edge of the profile by a distance greater than or equal to the radius of the pressure side curve portion and is within a range of 10% or less of a chord length of the turbine blade.

5. The turbine blade according to claim 1, wherein a connection point between the rear end of the blade suction side line and the suction side curve portion is located at a position spaced from a rearmost end of the blade trailing edge of the profile by a distance greater than or equal to three times the radius of the pressure side curve portion and is within a range of 10% or less of a chord length of the turbine blade.

6. The turbine blade according to claim 2, wherein a connection point between the rear end of the blade suction side line and the suction side curve portion is located at a position spaced from a rearmost end of the blade trailing edge of the profile by a distance greater than or equal to three times the radius of the pressure side curve portion and is within a range of 10% or less of a chord length of the turbine blade.

7. The turbine blade according to claim 1, wherein a connection point between the pressure side curve portion and the suction side curve portion is located so as to be within a range of 30° from the camber line to either one of suction side and pressure side of the camber line about the center of the pressure side curve portion lying on the camber line.

8. The turbine blade according to claim 2, wherein a connection point between the pressure side curve portion and the suction side curve portion is located so as to be within a range of 30° from the camber line to either one of suction side and pressure side of the camber line about the center of the pressure side curve portion lying on the camber line.

9. The turbine blade according to claim 3, wherein a connection point between the pressure side curve portion and the suction side curve portion is located so as to be within a range of 30° from the camber line to either one of suction side and pressure side of the camber line about the center of the pressure side curve portion lying on the camber line.

10. The turbine blade according to claim 4, wherein a connection point between the pressure side curve portion and the suction side curve portion is located so as to be within a range of 30° from the camber line to either one of suction side and pressure side of the camber line about the center of the pressure side curve portion lying on the camber line.

11. The turbine blade according to claim 5, wherein a connection point between the pressure side curve portion and the suction side curve portion is located so as to be within a range of 30° from the camber line to either one of suction side and pressure side of the camber line about the center of the pressure side curve portion lying on the camber line.

12. The turbine blade according to claim 6, wherein a connection point between the pressure side curve portion and the suction side curve portion is located so as to be within a range of 30° from the camber line to either one of suction side and pressure side of the camber line about the center of the pressure side curve portion lying on the camber line.

\* \* \* \* \*